United States Patent
Falcon et al.

(10) Patent No.: US 6,704,032 B1
(45) Date of Patent: Mar. 9, 2004

(54) METHODS AND ARRANGEMENTS FOR INTERACTING WITH CONTROLLABLE OBJECTS WITHIN A GRAPHICAL USER INTERFACE ENVIRONMENT USING VARIOUS INPUT MECHANISMS

(75) Inventors: Stephen R. Falcon, Woodinville, WA (US); Richard St. Clair Bailey, Bellevue, WA (US); Dan Banay, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 377 days.

(21) Appl. No.: 09/699,898

(22) Filed: Oct. 27, 2000

(51) Int. Cl.$^7$ ............................................... G06F 13/00
(52) U.S. Cl. ....................................... 345/746; 345/765
(58) Field of Search ................................ 345/746, 765, 345/767, 802, 822, 821; 701/2

(56) References Cited

U.S. PATENT DOCUMENTS

| | | | | |
|---|---|---|---|---|
| 5,673,401 A | * | 9/1997 | Volk et al. | 725/139 |
| 5,687,331 A | * | 11/1997 | Volk et al. | 345/840 |
| 5,821,935 A | * | 10/1998 | Hartman et al. | 345/839 |
| 6,201,540 B1 | * | 3/2001 | Gallup et al. | 345/764 |

* cited by examiner

Primary Examiner—Cao (Kevin) Nguyen
(74) Attorney, Agent, or Firm—Lee & Hayes, PLLC

(57) ABSTRACT

Improved methods and arrangements provide user interface platforms that are capable of meeting the unique requirements of manufacturers, while also advantageously supporting the development of independently designed software applications. In accordance with certain aspects of the present invention, methods and arrangements are provided whereby certain key events are defined and operatively associated with the hardware suite. These key events, which are essentially virtual events, can be invoked or otherwise implemented by the manufacturers and independent software vendor (ISV) applications. These key events are categorized as being either determinate events or indeterminate events, and their functionality can be based on different behavior models. The behavior models consider the notion that the user interface will most likely include various focusing (e.g., function selection) and/or editing (e.g., parameter modifying) capabilities. As such, the methods and arrangements can support several different behavior models, including, for example, a full-focus mode, a focus-free mode, and an edit-free mode.

41 Claims, 8 Drawing Sheets

METHODS AND ARRANGEMENTS FOR INTERACTING WITH CONTROLLABLE OBJECTS WITHIN A GRAPHICAL USER INTERFACE ENVIRONMENT USING VARIOUS INPUT MECHANISMS

TECHNICAL FIELD

This invention relates to graphical user interfaces (GUIs), and more particularly to methods and arrangements that support the interaction of the user, through a variety of different types of input mechanisms, with different types of controllable objects displayed within a GUI environment.

BACKGROUND

Graphical user interfaces (GUIs) are popular in a variety of computing applications and/or operating systems. A typical GUI provides visual feedback to the user of his or her actions (e.g., inputs and responses thereto).

There is an ongoing move to make devices or other types of appliances seemingly "smarter" or at least more user friendly by introducing similar graphical interfaces and like capabilities. Thus, for example, kiosks, automatic teller machines, microwave ovens, video cassette recorders (VCRs), cellular telephones, and the like are beginning to provide GUIs that are programmed to enrich the user's interactions with the device or appliance. This may include, for example, adding selectable icons, scrollable lists, and hierarchical forms or pages.

More interestingly for this background section, in certain instances, physical user interfaces, such as, e.g., knobs, buttons, switches, handles, and the like, can be graphically modeled and included within the graphical user interface as selectable/movable objects. Hence, a user can graphically open a closed drawer, turn up/down a volume control, or perhaps select a feature, product or service.

Causing such an action to occur typically requires the user to provide the requisite user inputs to the controlling operating logic. This may include physically moving and/or activating an input mechanism, such as, e.g., a mouse, a trackball or the like, which provides corresponding user input signals to the operating logic, directly or indirectly. The operating logic (e.g., an operating system software and associated hardware suite) may also be configured to interact with other program logic (e.g., application software).

Another common type of physical input device is a touch pad or touch screen. Touch screens are usually configured to allow the user to touch an exposed surface on a cathode ray tube (CRT), liquid crystal display (LCD), plasma display, or the like, through which the GUI environment and the controllable objects are visible. Here, the user may touch the exposed surface with his or her finger or some other object, such as, e.g., a stylus. The touch screen includes a detection mechanism (e.g., an electrically detectable grid array) configured to detect the point of contact on the exposed surface and to provide this positional information to the operating logic. Provided with this positional information, the operating logic and/or program logic can determine which controllable object, the user is attempting to select, move, alter, or otherwise influence.

Manufacturers of various systems and devices tend to invest significant resources into the development of functional and often aesthetically pleasing physical and/or virtual user interfaces. These manufacturers, e.g., original equipment manufacturers (OEMs), usually have a preferred style for their user interface and associated functionality that usually differentiates their product, at least commercially, from their competitor's products.

Having a wide variety of user interfaces can prove challenging to independent software developers and others attempting to produce software products that run on a variety of devices. By way of example, automobile computer manufacturers have a strong desire to maintain control over the user interaction model their products exhibit. This has historically provided a significant barrier to the development of user-interface platform technology that supports running independently designed software applications on such OEM products. One of the problems in this exemplary industry is that different OEMs implement different hardware input schemes. For example, one manufacturer may favor using a single rotating knob with an enter/action button for navigation of their product's GUI form, whereas another might favor a directional pad (up, down, left, right) and an enter/action key.

Consequently, there is a need for improved methods and arrangements that provide user interface platforms that are capable of meeting the varying interface requirements of manufacturers, while also promoting the development of independently designed software applications.

SUMMARY

Improved methods and arrangements provide user interface platforms that are capable of meeting the unique requirements of manufacturers, while also advantageously supporting the development of independently designed software applications.

In accordance with certain aspects of the present invention, methods and arrangements are provided whereby certain key events are defined and operatively associated with the hardware suite. These key events, which are essentially virtual events, can be invoked or otherwise implemented by the manufacturers and independent software vendor (ISV) applications. These key events are categorized as being either determinate events or indeterminate events, and their functionality can be based on different behavior models.

The behavior models consider the notion that the user interface will most likely include various focusing (e.g., function selection) and/or editing (e.g., parameter modifying) capabilities. As such, the methods and arrangements can support several different behavior models, including, for example, a full-focus mode, a focus-free mode, and an edit-free mode.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
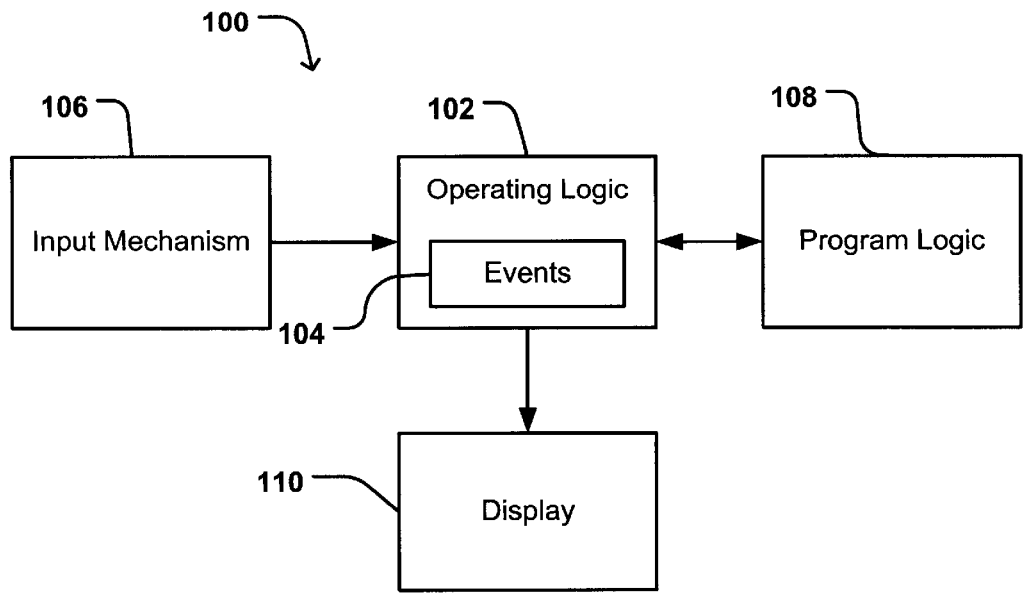
FIG. 1 is block diagram depicting an exemplary device having a user input mechanism, a display device, operating logic, and program logic, suitable for use with certain implementations of the present invention.

In FIG. 1 a device 100 is depicted as including operating logic 102 wherein certain key events 104 have been defined. Operating logic 102 is operatively coupled to at least one user input mechanism 106 and a display device 110. Additionally, program logic 108 is operatively configured to function with operating logic 102.

Device 100 can be any device, including, for example, a stand alone device, a peripheral device, an appliance, a hand-held device, an entertainment device, a communication device, a portable device, etc., that is designed to present the user with a GUI environment having controllable objects, features or functions.

With this in mind, in accordance with certain exemplary implementations, device 100 can include a computer, for example, as described below and shown in FIG. 2.

Operating logic 102 can include hardware components, software components, or a mixture thereof. For example, in certain implementations operating logic 102 includes processing and memory hardware (not shown), wherein the processing hardware is responsive to operating system and other software instructions as stored within the memory or as otherwise provided.

Regardless of form, in accordance with certain exemplary implementations, operating logic 102 is essentially programmable to receive user inputs from input mechanism 106, and map the user inputs to key events that can be processed per instruction from within operating logic 102 and/or program logic 108. Certain processed key events will modify the functioning of device 100 in some way.

Input mechanism 106 includes at least one physical user input device, such as, e.g., an electrical switch, a mechanical switch, an optical switch, a thermal switch, a transducer, a touch pad, a keypad, a button, a rotating knob, a push knob, a pull knob, a directional pad, a toggle switch, a joystick, or the like. Hence, input mechanism 106 allows the user to initiate an event that is detectable by operating logic 102.

Program logic 108 may also include hardware components, software components, or a mixture thereof. However, for simplicity the remainder of this description assumes that program logic 108 is essentially a software product.

Display 110 can include any conventional display or monitor, including, e.g., a cathode ray tube (CRT), a liquid crystal display (LCD), a plasma display, a projector, a light display, etc. Though depicted as functionally separate in FIG. 1, display device 110 may also be both operatively and physically associated with input mechanism 106, as is often the situation with touch screens and the like.

Figure 2:
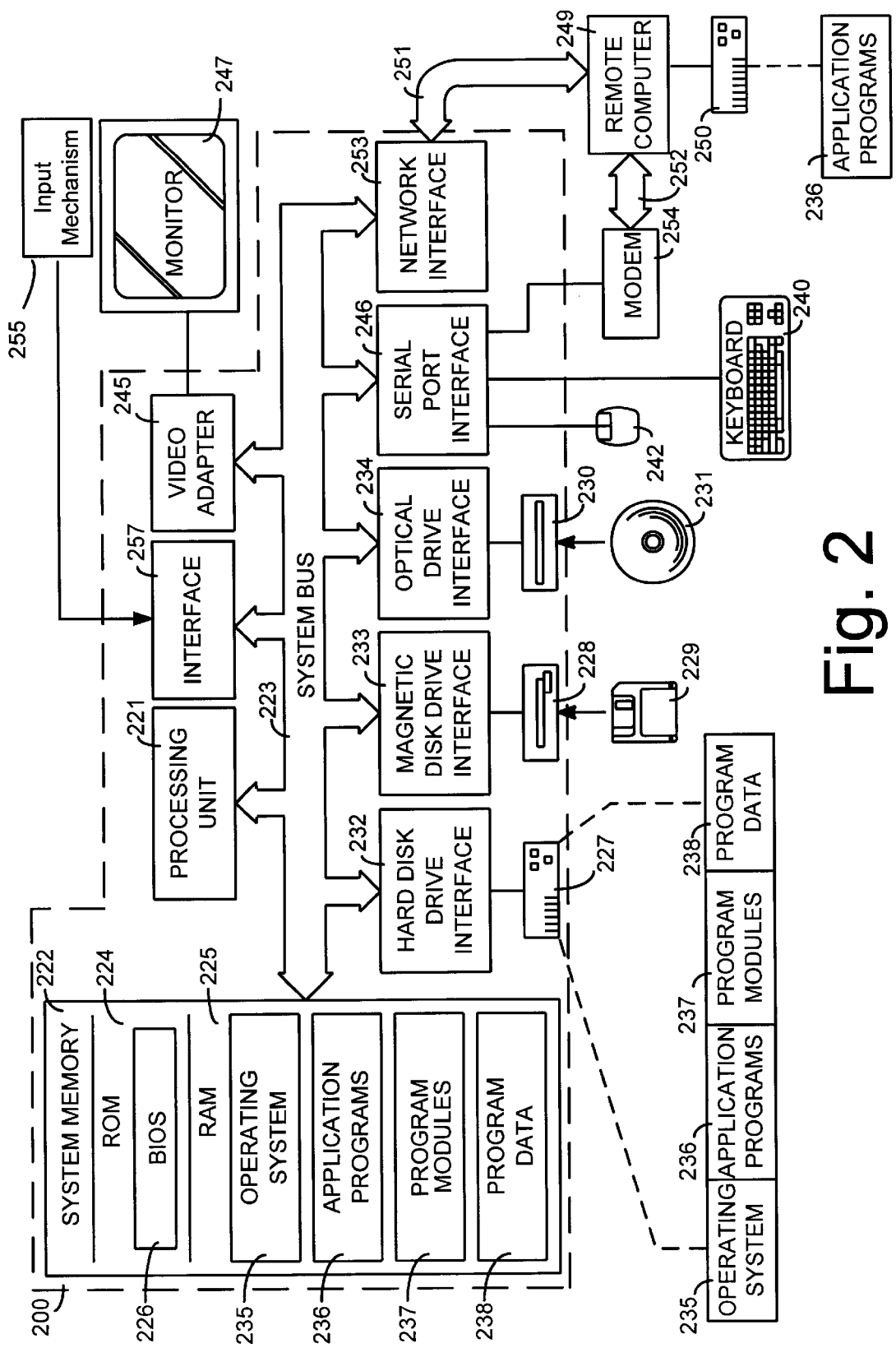
FIG. 2 is a block diagram depicting an exemplary computer environment that is suitable for use with certain implementations of the present invention.

Reference is now made to FIG. 2, which is a block diagram of an exemplary computing system 200.

Computing system 200 is, in this example, a personal computer (PC), however, in other examples computing system may take the form of a special-purpose device, an appliance, a handheld computing device, a cellular telephone device, a pager device, etc. Moreover, the arrangement in FIG. 1 can be distributed between a plurality of computers/devices.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse, etc.). An additional input mechanism(s) 255 can also be included via an appropriate interface 257.

As shown, a monitor 247 or other type of display device is also connected to the system bus 223 via an interface, such as a video adapter 245. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

Figure 3:
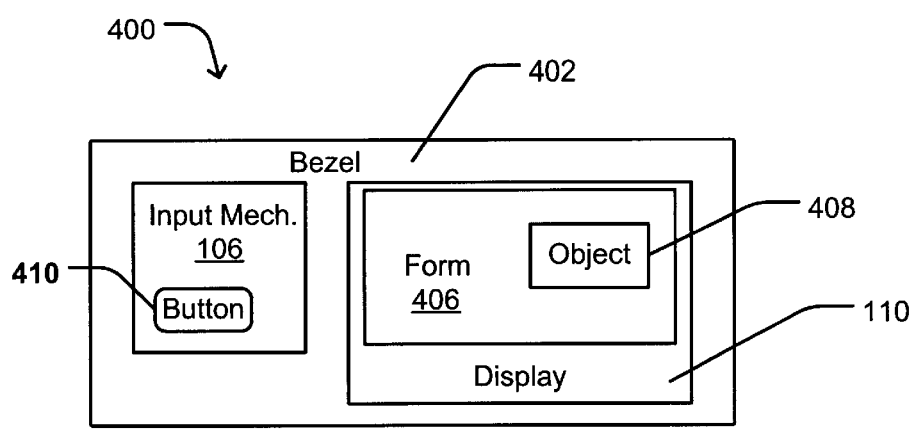
FIG. 3 is a graphical illustration of a frontal view of an exemplary device, as in FIG. 1, having a user input mechanism and a display.

Reference is now made to FIG. 3, which graphically depicts an exemplary device in the form of an automobile computer 400 suitable for mounting in a dashboard location. As viewed from the front, automobile computer 400 includes a bezel 402 providing access to at least one input mechanism 106 and display 110. Here, for example, input mechanism 106 includes an action button 410. Action button 410 may be associated a variety of actions, including, e.g., navigating a displayed GUI environment or form 406, selecting a feature/function, entering data, or the like.

As shown, display 110 includes a GUI environment or form 406 having a controllable object 408 displayed therein. Controllable object 408 can take a variety of forms, including, e.g., information input objects, controllable indicator objects, virtual button objects, virtual switch objects, virtual keypad objects, virtual panel objects, etc.

Figure 4:
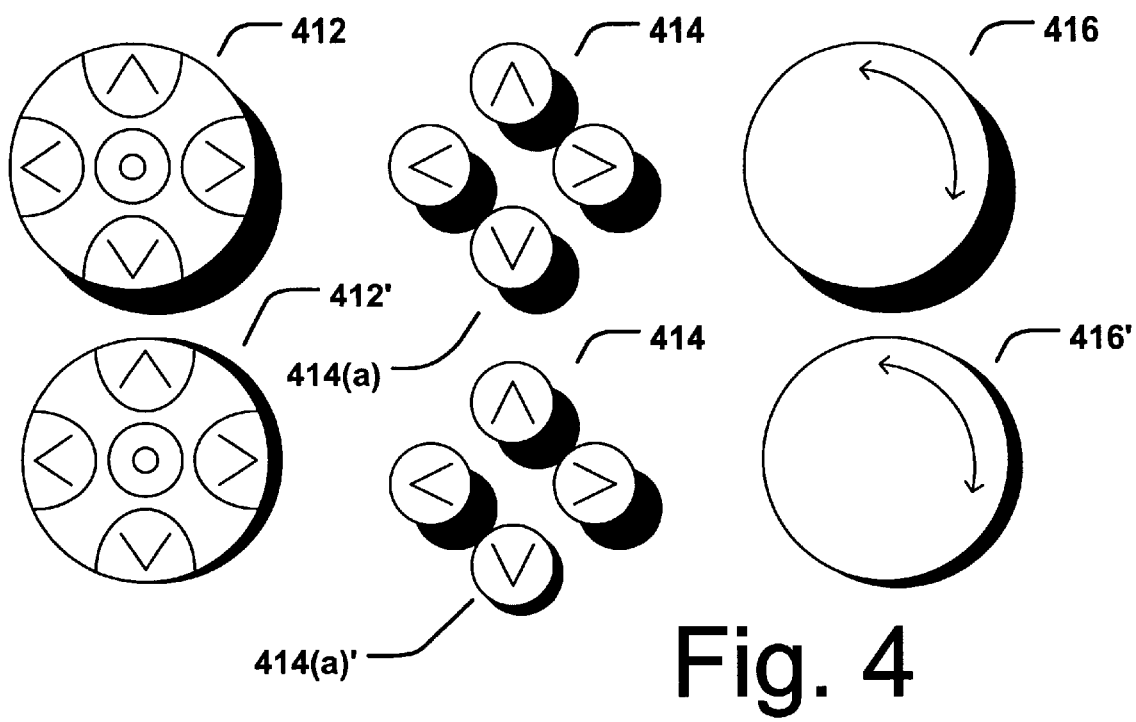
FIG. 4 is a graphical illustration of a plurality of exemplary input mechanisms suitable for use in the device of FIG. 1.

FIG. 4 depicts certain exemplary input mechanisms, suitable for use as input mechanism 106. The first example is a directional pad 412 that allows the user to selectively navigate through form 406 and/or otherwise selectively control controllable object 408. Here, as depicted in the upper example, directional pad 412 allows for up, down, left, and right input selections. In certain implementations, directional pad 412 may also provide for an action input by allowing the user to push inward at the center. This type of activation is graphically demonstrated in the lower example of directional pad 412'.

The next example in FIG. 4 is a set of directional buttons 414 that together provide navigational inputs. In the upper example directional button (down) 414(a) is not activated, while in the lower example 414(a)' is activated.

In another example of FIG. 4, a rotating knob 416 is depicted. Here, rotating knob 416 is demonstrated as being a push-knob because it can be depressed in addition to be rotated. When knob 416' is depressed by the user, for example, as demonstrated in the lower example, the user is able to provide an action input. Hence, a user can navigate about an appropriately configured form 406 by selectively rotating the knob and pushing the knob inward.

Figure 5:
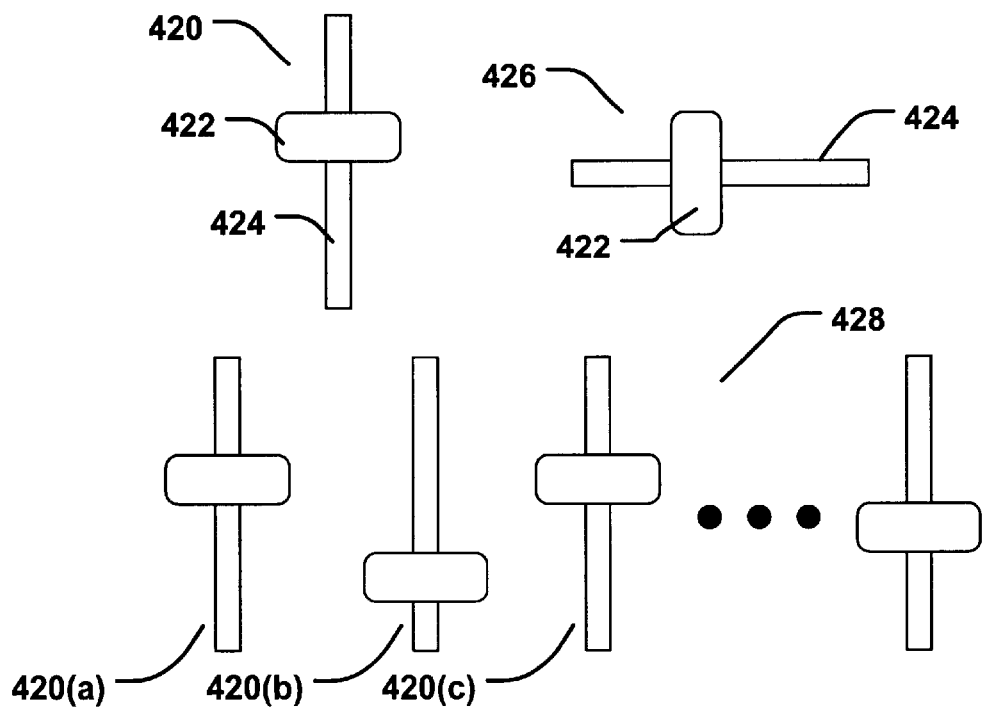
FIG. 5 is a graphical illustration of a plurality of exemplary controllable objects suitable for display by the device of FIG. 1.

FIG. 5 illustrates certain exemplary controllable objects 408 in the form of sliders. The first example is a virtual vertical slider 420. Here, a thumb 422 is can be adjusted or moved along channel 424 to modify operating parameters, select features/functions, etc. The next example is a virtual horizontal slider 426, which is essentially vertical slider 420 rotated 90 degrees to one side. Hence, horizontal slider 426 also includes a thumb 422 that travels along a channel 424. The remaining example in FIG. 5 is a virtual row of vertical sliders 428 that includes a plurality of vertical sliders 420, such as, vertical sliders 420(a–c).

Improved methods and arrangements will now described whereby virtual key events 104 are operatively associated with input mechanism 106. This scheme allows program logic 108 to be designed to interpret events 104 in a manner that remains faithful to a desired interaction model associated with device 100. Thus, for example, an OEM is able to design a unique hardware user interface to work in conjunction with the controllable object(s) 408, without compromising application compatibility or user-interface consistency.

By way of example, let us assume that program logic 108 is a graphic equalizer having a row of vertical sliders 428. By implementing this scheme the graphic equalizer program could run on devices having a touch screen input mechanism, and also on devices having a push-knob input mechanism.

Key events 104 come in two varieties. The first variety is termed "determinate" in that the resulting control action is always intended to be the same, regardless of an edit state associated with either a controllable object 408 or form 406. The second variety is termed "indeterminate" in that the resulting control action varies based on the edit state.

In accordance with certain exemplary implementations, determinate key events include focus adjusting events, such as, e.g., focus right, focus left, focus up, focus down, focus upper right, focus lower left, focus upper left, focus lower right. The determinate key events also include value adjusting events, such as, e.g., value right, value left, value up, value down, value increment, value decrement. Certain edit key events are also determinate key events, such as, e.g., enter edit mode and exit edit mode; as are certain focus key events such as, focus next and focus previous. Indeterminate key events can include key events such as right, left, up, down, and other key events such as, e.g., advance, decline, and action.

In accordance with certain aspects, an OEM, for example, provides a driver program that is configured to map input mechanism 106 to the key events 104, according to the OEM's desired interaction model. For example, a rotating knob could generate Advance/Decline events, a directional pad could generate Right/Left/Up/Down events, and/or an enter button could generate an Action event. Likewise, a combination directional pad and rotating knob could generate Focus Right/Left/Up/Down and Value Increment/Decrement events, respectively. Combination "move" and "adjust" knobs could generate Focus Next/Previous and Value Increment/Decrement events, respectively. In still another example, combination Enter/Back buttons would generate Enter/Escape events, respectively.

Preferably, each controllable object (e.g., 408) is configured to respond to all applicable key events. Thus, for example, horizontal slider 426 (see FIG. 5) could be configured as follows:

| Determinate Key Events: | |
| --- | --- |
| Focus Right | 'no-op |
| Focus Left | 'no-op |
| Focus Up | 'no-op |
| Focus Down | 'no-op |
| Focus UpperRight | 'no-op |
| Focus LowerLeft | 'no-op |
| Focus UpperLeft | 'no-op |
| Focus Lower Right | 'no-op |
| Focus Next | 'no-op |
| Focus Previous | 'no-op |
| Value Right = increase value | |
| Value Left = decrease value | |
| Value Up | 'no-op |
| Value Down | 'no-op |
| Value Increment = increase value | |
| Value Decrement = decrease value | |
| Enter Edit = enter edit mode | |
| Exit Edit = exit edit mode | |
| Indeterminate Key Events: | |
| | |
| Right = if edit mode, increase value | |
| Left = if edit mode, decrease value | |
| Up = if edit mode, increase value | |
| Down = if edit mode, decrease value | |
| Advance = if edit mode, increase value | |
| Decline = if edit mode, decrease value | |
| Action = if edit mode, exit; if non-edit mode, enter edit mode | |

There are several types of operational behavior models that can be supported through the proper selection of key events and responses thereto. In a first example, a full-focus behavior model will be illustrated with references to FIGS. 6(a–f).

In FIG. 6(a) a display 110 is shown as having two vertical sliders, i.e., controllable objects 420(a) and 420(b). Since there are two sliders in this example, the user needs to be able to select between them. In accordance with certain exemplary implementations, a "focus" capability is provided wherein applicable user inputs are associated with changing the focus or selection between controllable objects.

This focus capability associated with the exemplary full-focus behavior model is illustrated in FIGS. 6(b) and 6(c). In FIG. 6(b), operating logic 102 and/or program logic 108 have interpreted focus key events as placing controllable object (slider) 420(a) in focus as illustrated by surrounding dashed line box 440. Placing controllable object 420(a) in focus may be accompanied by some graphical change thereto; for example, the object may be highlighted or brightened in some way. Next, in FIG. 6(c), focus has moved to controllable object (slider) 420(b) as illustrated by surrounding dashed line box 440.

Figure 6:
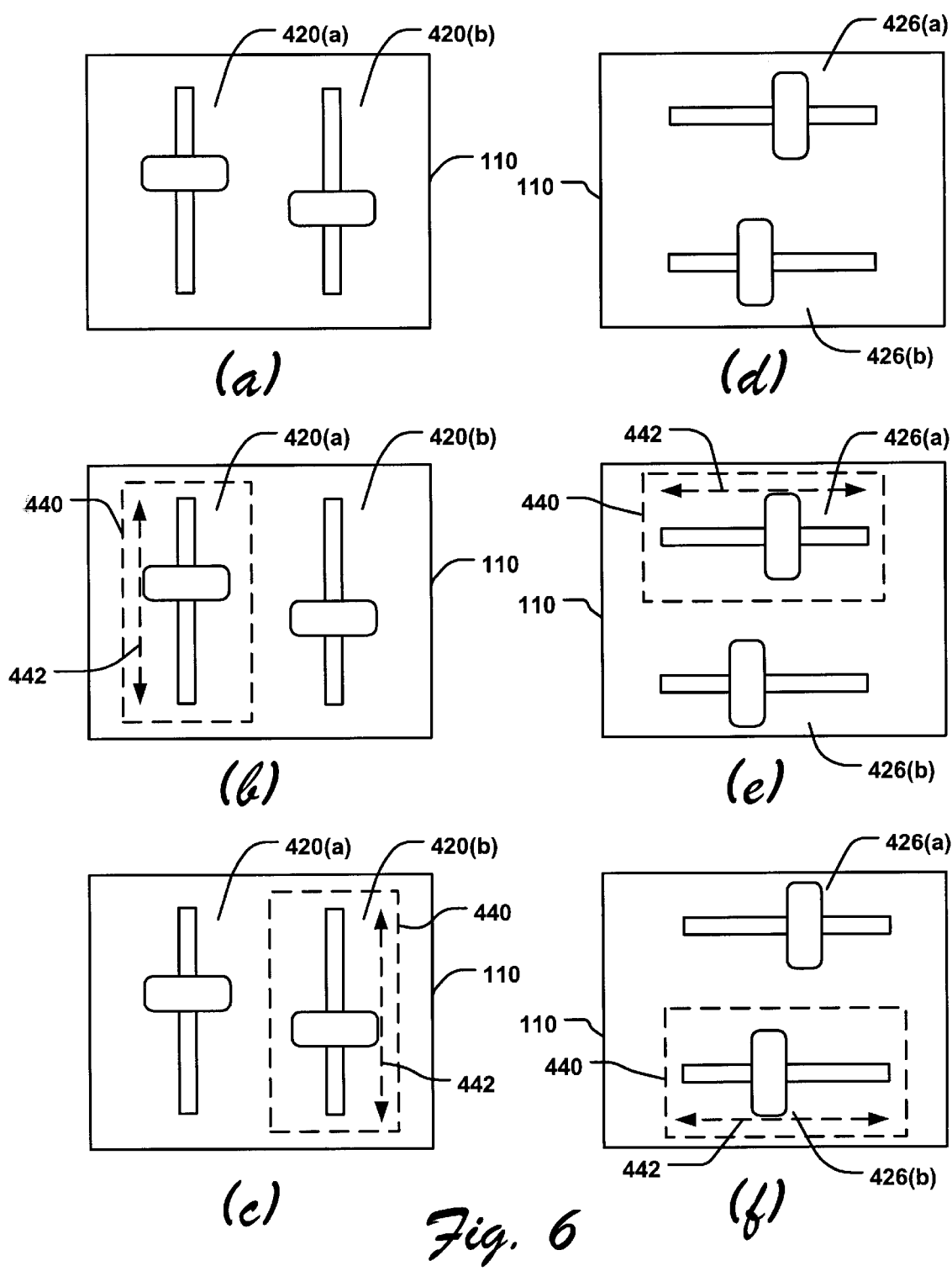
FIGS. 6(a–f) demonstratively illustrate certain exemplary methods associated with a full-focus behavior model in which controllable objects, as in FIG. 5, are selectively brought into focus and the object/form is selectively placed into an edit mode through user inputs.

FIGS. 6(d–f) are similar to FIGS. 6(a–c), respectively, for two horizontal slider controllable objects 426(a) and 426(b). As shown, in FIG. 6(e), controllable object 426(a) has been placed in focus as illustrated by surrounding dashed line box 440. In FIG. 6(f), focus has moved to controllable object (slider) 426(b), again as illustrated by surrounding dashed line box 440.

In the exemplary full-focus behavior model, once the user has selected a controllable object by placing the object in focus, then the controllable object and/or form needs to be placed in an "edit mode" that allows the controllable object to be controlled, e.g., to modify/change values associated with the controllable object. Determinate key events are provided for entering/exiting edit mode. The edit mode can be associated with controllable objects and/or the form. Referring to FIGS. 6(b–c) and FIGS. 6(e–f), an edit mode has been illustrated by dashed directional arrow 442. Thus, for example, in FIG. 6(b) controllable object 420(a) is in focus (box 440) and the controllable object is in edit mode (arrow 442). In FIG. 6(c), controllable object 420(b) is in focus (box 440) and in edit mode (arrow 442). Similarly, the presence of arrow 440 in FIGS. 6(e) and 6(f) place the controllable object (that is in focus) in edit mode.

Figure 7:
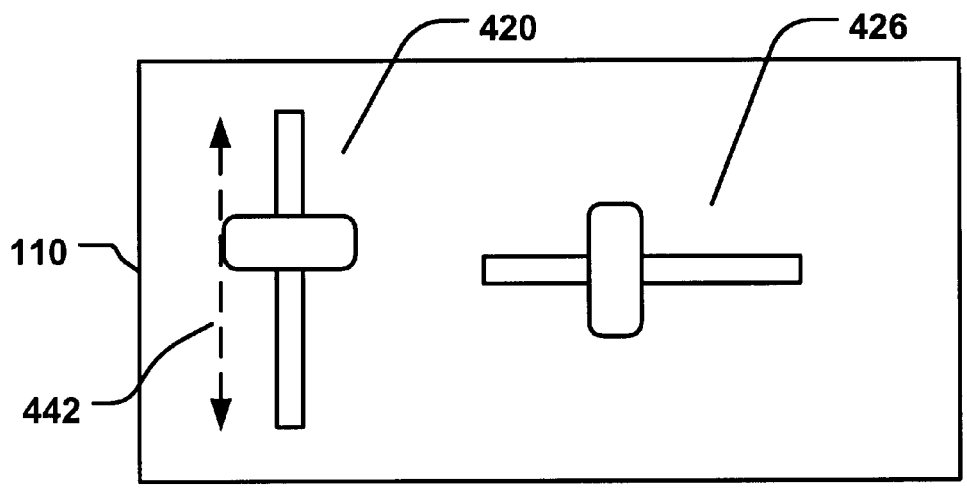
FIGS. 7(a–b) demonstratively illustrate certain exemplary methods associated with a focus-free behavior model in which controllable objects, as in FIG. 5, are inherently in focus for selected events and edited through user inputs with the object/form in edit mode.
Figure 7:
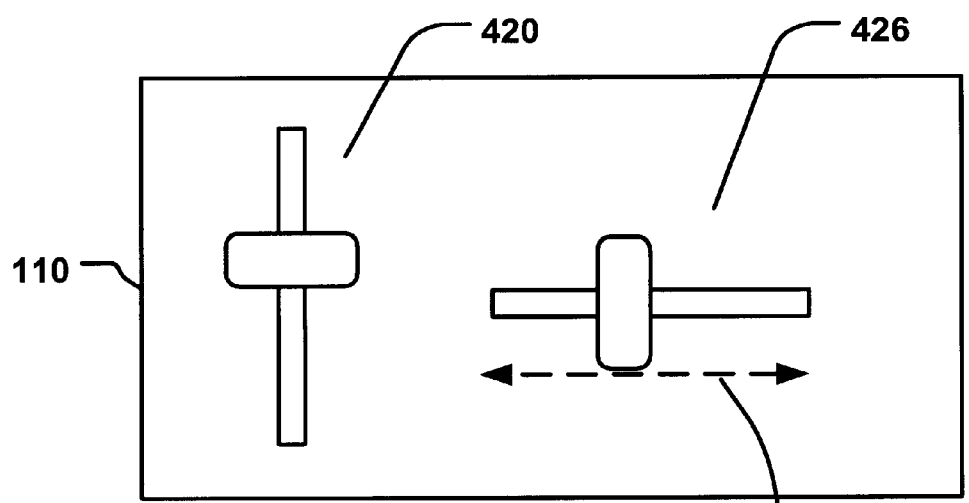

Another operational behavior model is a "focus-free" model. An exemplary focus-free model is illustrated in FIGS. 7(a–b). In FIG. 7(a), display 110 includes a form having a vertical slider controllable object 420 and a horizontal slider controllable object 426. As should be apparent from this illustration, an up or down key events need only be operatively associated with vertical slider controllable object 420. Likewise, left or right key events need only be operatively associated with horizontal slider controllable object 426. Consequently, in this example, there is no reason to require the user to place a controllable object into focus, hence the name focus-free.

The controllable objects/form is essentially, inherently in an edit mode for selected key events, as illustrated by dashed arrows 442 in FIGS. 7(a–b). In FIG. 7(a) controllable object 420 is shown as being editable. In FIG. 7(b) controllable lo object 426 is shown as being editable. In certain implementations, the controllable objects are configured to support event "focus-free" properties that determine for select determinate or indeterminate events, whether the controllable object should always receive the key events regardless of any current focus.

For FIGS. 7(a–b), for example, the controllable objects could be operatively configured as follows:

(1) The horizontal slider's properties are set as follows:
FocusFreeRightLeft = True;   //control always gets Right and Left events.
EditFreeRight = True;        //indeterminate Right always increases value.
EditFreeLeft = True;         //indeterminate Left always decreases value.
EditFreeUp = False;          //if edit mode, increase value.
EditFreeDown = False;        //if edit mode, decrease value.
EditFreeAdvance = False;     //if edit mode, increase value.
EditFreeDecline = False;     //if edit mode, decrease value.
(2) The vertical slider's properties are set as follows:
FocusFreeUpDown = True;      //control always gets Up and Down events.
EditFreeRight = False;       //if edit mode, increase value.
EditFreeLeft = False;        //if edit mode, decrease value.
EditFreeUp = True;           //indeterminate Up always increases value.
EditFreeDown = True;         //indeterminate Down always decreases value.
EditFreeAdvance = False;     //if edit mode, increase value.
EditFreeDecline = False;     //if edit mode, decrease value.

Figure 8:
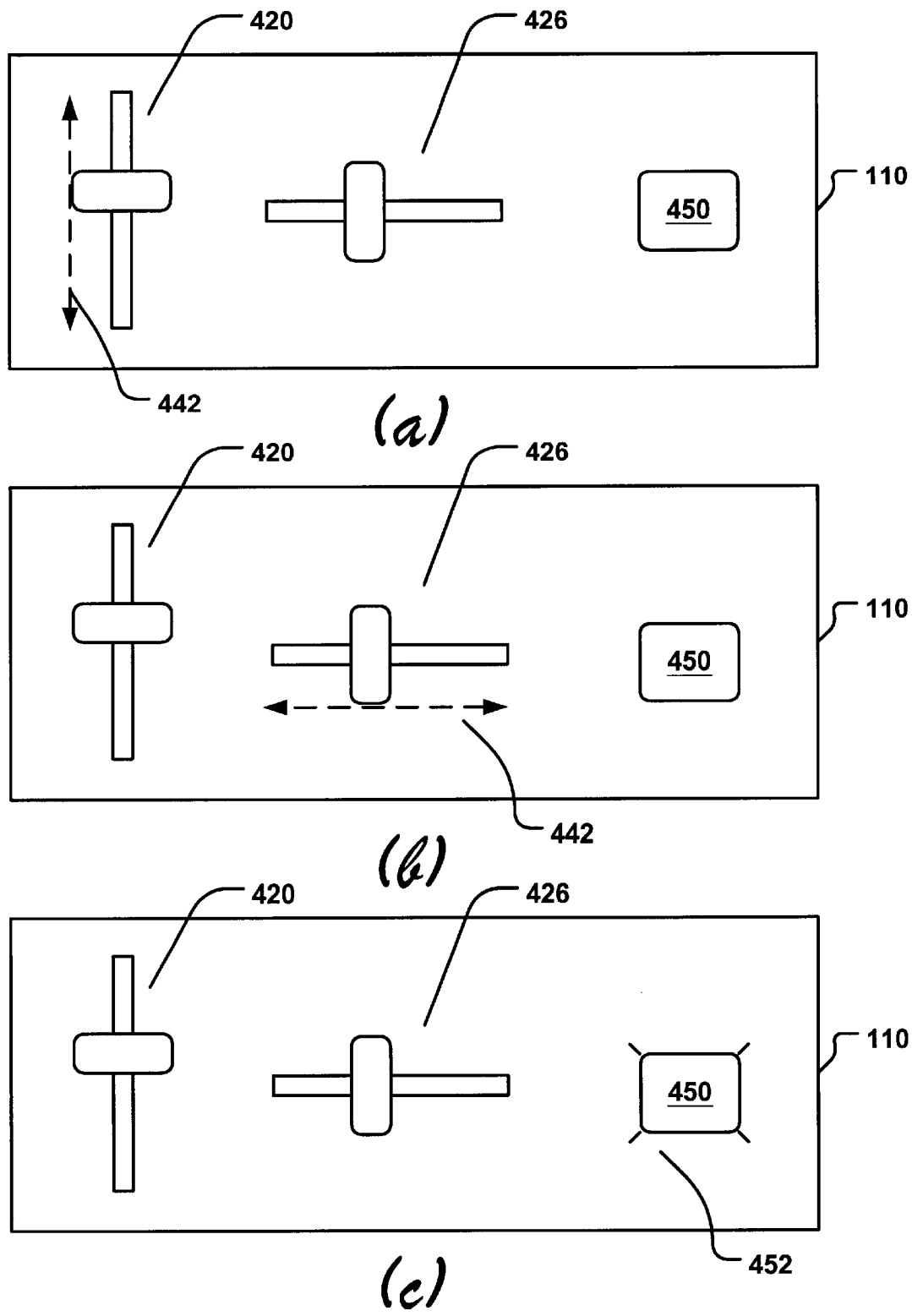
FIGS. 8(a–c) demonstratively illustrate certain further exemplary methods associated with a focus-free behavior model in which controllable objects, as in FIG. 5 and FIG. 1, are inherently in focus for selected events and edited through user inputs with the object/form in edit mode.

FIGS. 8(a–c) each depict yet another example of a form that could implement a focus-free behavior model. Here, in addition to controllable objects 420 and 426, as in FIGS. 7(a–b), an additional virtual action button 450 has been included in the form on display 110.

As illustrated by dashed arrows 442, vertical slider controllable object 420 is editable in FIG. 8(a) and horizontal slider controllable object 426 is editable in FIG. 8(b). In FIG. 8(c) virtual action button 450 is editable as illustrated by lines 452 extending outwardly.

For FIGS. 8(a–c), for example, the controllable objects could be operatively configured as follows:

(1) The horizontal slider's properties are set as follows:
FocusFreeRight = True;     //slider always gets Right event.
FocusFreeLeft = True;      //slider always gets Left event.
EditFreeRight = True;      //indeterminate Right always increases value.
EditFreeLeft = True;       //indeterminate Left always decreases value.
EditFreeUp = False;        //if edit mode, increase value.
EditFreeDown = False;      //if edit mode, decrease value.
EditFreeAdvance = False;   //if edit mode, increase value.
EditFreeDecline = False;   //if edit mode, decrease value.
(2) The vertical slider's properties are set as follows:
FocusFreeUp = True;        //slider always gets Up event.
FocusFreeDown = True;      //slider always gets Down event.
EditFreeRight = False;     //if edit mode, increase value.
EditFreeLeft = False;      //if edit mode, decrease value.
EditFreeUp = True;         //indeterminate Up always increases value.
EditFreeDown = True;       //indeterminate Down always decreases value.
EditFreeAdvance = False;   //if edit mode, increase value.
EditFreeDecline = False;   //if edit mode, decrease value.
(3) The virtual action button's properties are set as follows:
FocusFreeAction = True;    //button always gets Enter event.

An OEM, for example, may also selectively control the availability of a focus-free behavior model using overriding identifiers. In certain implementations, therefore, in order for focus-free behavior to be exhibited, the OEM must declare which focus-free events will be supported by the device and their prescribed interaction model.

For example, an AllowFocusFree<event(s)> option can be provided that indirectly determines whether focus-free behavior will be honored for a particular form. Here, an OEM must satisfy all focus-free requests within a form before any focus-free behavior will be exhibited.

Examples include:
(1) Focus-free granted:
  ISV form requests:
    FocusFreeRightLeft=True
    FocusFreeUp/Down=True
  OEM settings:
    AllowFocusFreeRightLeft=True
    AllowFocusFreeUpDown=True
  Result=Fully focus-free operation will be exhibited on the form. No controls will display focus.
(2) Focus-free not granted:
  ISV form requests:
    FocusFreeRightLeft=True
    FocusFreeUp/Down=True
  OEM settings:
    AllowFocusFreeRightLeft=True
    AllowFocusFreeUpDown=False
  Result=No focus-free operation will be exhibited on the form. All interactive controls will display focus, and will need to get focus in order to receive key events.

Figure 9:
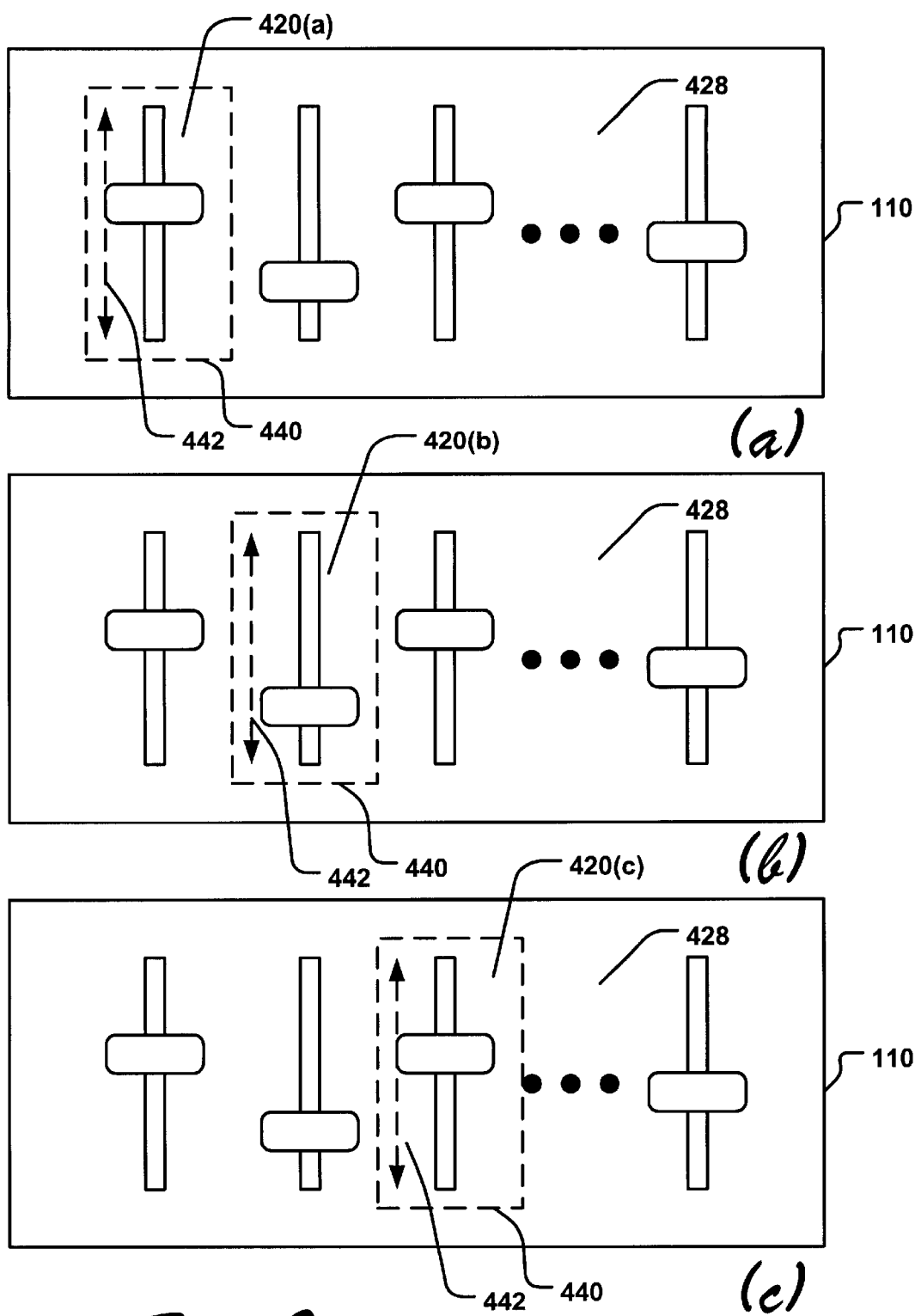
FIGS. 9(a–c) demonstratively illustrate certain exemplary methods associated with a edit-free behavior model in which controllable objects, as in FIG. 5, are selectively brought into focus and edited through user inputs with the object/form in edit mode.

FIGS. 9(a–c) each depict yet another exemplary behavior model. Here, the form can include "edit-free" behaviors. As illustrated, in each of FIGS. 9(a–c), display 110 includes a form having a row of vertical slider controllable objects 428. Here, because each of the controllable objects (420) responds to similar inputs (e.g., up/down), the edit-free behavior allows the user to simply place one of the controllable objects in focus and edit it without having to explicitly enter the object/form into an edit mode.

Thus, for example, in FIG. 9(a) controllable object 420(a) becomes editable (arrow line 442) upon being placed in focus (box 440). In FIG. 9(b), controllable object 420(b) becomes editable (arrow line 442) upon being placed in focus (box 440). Similarly, as shown in FIG. 9(c), controllable object 420(c) becomes editable (arrow line 442) upon being placed in focus (box 440).

As before, certain implementations support the OEM's ability to override program logic 108 with respect to forms that request edit-free behavior. Thus, for example, an AllowEditFree option can be implemented that determines whether the OEM will honor any controllable objects' EditFree<event>=True settings. If AllowEditFree is set to False, any control that would otherwise allow manipulation regardless of edit-mode would, nevertheless would need to be in edit mode.

By way of example, with such an AllowEditFree option set to False the side-by-side vertical sliders of FIGS. 6(a–c) can be operatively configured as follows in an edit-free behavior model:

Both vertical sliders' edit-free properties can be set as follows:
EditFreeRight = False;     //if edit mode, increase value.
EditFreeLeft = False;      //if edit mode, decrease value.
EditFreeUp = True;         //indeterminate Up always increases value.
EditFreeDown = True;       //indeterminate Down always decreases value.
EditFreeAdvance = False;   //if edit mode, increase value.
EditFreeDecline = False;   //if edit mode, decrease value.
Similarly, with an AllowEditFree option set to False, for a horizontal slider, the edit-free properties can be set as follows:
EditFreeRight = True;      //indeterminate Right always increases value.
EditFreeLeft = True;       //indeterminate Left always decreases value.
EditFreeUp = True;         //indeterminate Up always increases value.
EditFreeDown = True;       //indeterminate Down always decreases value.
EditFreeAdvance = True;    //inderterminate Advance always increases value.
EditFreeDecline = True;    //indeterminate Decline always decreases value.

Figure 10:
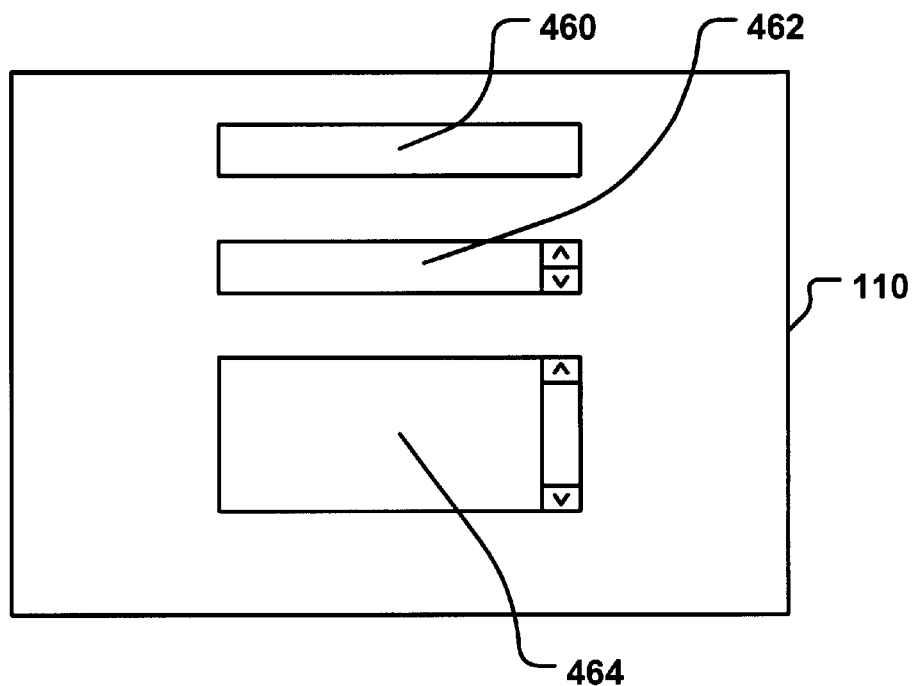
FIG. 10 demonstratively illustrates a plurality of additional exemplary controllable objects suitable for display by the device of FIG. 1.

Reference is now made to FIG. 10, which depicts certain other exemplary types of controllable objects that may also be included in a form on display 110. Here, an edit box object 460, a spinner box object 462 and a scrollable list box object 464 are depicted. These and other GUI object and various forms, themes, and the like are well known.

Figure 11:
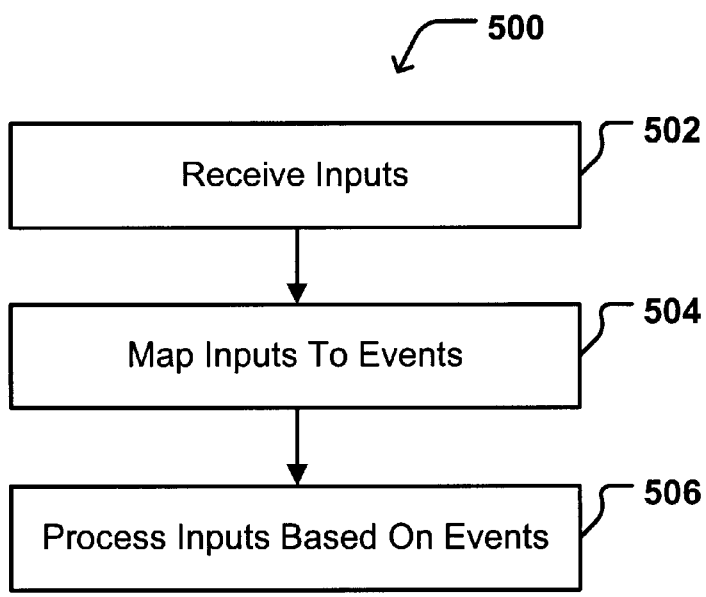
FIG. 11 is a flow-chart depicting a method for mapping user inputs to key events in accordance with certain exemplary implementations of the present invention.

A flow-chart is depicted in FIG. 11 for a method 500 for mapping user inputs to key events 104 (see FIG. 1), in accordance with certain exemplary implementations. In step 502, user inputs are received from at least one input mechanism 106. In step 504, the inputs are mapped to key events 104. In step 506, the inputs are processed according to the key events 104.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. A method for interfacing multiple different user input hardware arrangements with virtual object-based graphical user interface logic, the method comprising:
  generating a displayable form within a graphical user interface, the displayable form including at least one controllable virtual user-input object;
  establishing a set of key events, wherein at least a portion of the key events can be operatively associated with a plurality of different types of non-virtual user input mechanisms;
  receiving user input via at least one non-virtual user input mechanism selected from the plurality of different types of non-virtual user input mechanisms;

establishing a behavior model for the displayable form; and determining when an operational change associated with the controllable virtual user-input object is required based at least on the behavior model and the received user input and when appropriate causing the operational chance to occur such that the virtual user-input controllable object is graphically altered in appearance and associated controlled logic functionality is modified accordingly.

2. The method as recited in claim 1, wherein the controllable virtual user-input object is only operatively controllable when in an edit mode.

3. The method as recited in claim 2, wherein the controllable virtual user-input object is selectively placed in the edit mode via at least one of the key events.

4. The method as recited in claim 2, wherein the controllable virtual user-input object is selectively placed in the edit mode via an override identifier.

5. The method as recited in claim 2, wherein the controllable virtual user-input object is always in the edit mode.

6. The method as recited in claim 1, wherein the controllable virtual user-input object is only operatively controllable when the controllable virtual user-input object is in a focus mode.

7. The method as recited in claim 6, wherein the controllable virtual user-input object is selectively placed in the focus mode via at least one of the key events.

8. The method as recited in claim 6, wherein the controllable virtual user-input object is always in the focus mode.

9. The method as recited in claim 1, wherein the controllable virtual user-input object is programmable to selectively respond to each one of the key events.

10. The method as recited in claim 1, wherein the set of key events includes a subset of key events that operate independent an operational mode associated with the displayable form, and the operational mode includes an edit mode and a non-edit mode.

11. The method as recited in claim 1, wherein the set of key events includes a subset of key events that operate depending upon an operational mode associated with the displayable form, and the operational mode includes an edit mode and a non-edit mode.

12. The method as recited in claim 1, wherein a plurality of controllable virtual user-input objects are provided within the displayable form and a focus on a particular one of the controllable virtual user-input objects is selectable via at least one corresponding focus event selected from the set of key events.

13. The method as recited in claim 12, wherein, when placing the focus on the particular one of the controllable virtual user-input objects further allows the controllable virtual user-input object to be selectively placed in the edit mode via a corresponding edit event selected from the set of key events.

14. The method as recited in claim 13, wherein the controllable virtual user-input object is automatically placed in the edit mode when the focus is on the particular one of the controllable virtual user-input objects.

15. The method as recited in claim 1, wherein at least one of the set of key events is selected from a group of key events comprising: focus right, focus left, focus up, focus down, focus upper right, focus, lower left, focus, upper left, focus lower right, value right, value left, value up, value down, value increment, value decrement, enter edit, exit edit, focus next, focus previous, right, left, up, down, advance, decline, action, edit free right, edit free left, edit free up, edit free down, edit free advance, and edit free decline.

16. The method as recited in claim 1, wherein the non-virtual user input mechanism is selected from a group of input mechanisms comprising: an electrical switch, a mechanical switch, an optical switch, a thermal switch, a transducer, a touch pad, a keypad, a button, a rotating knob, a push knob, a pull knob, a directional pad, a toggle switch, and a joystick.

17. The method as recited in claim 1, wherein the controllable virtual user-input object is selected from a group of graphically displayable controllable virtual user-input objects comprising sliders, knobs, buttons, edit fields, spinners, and scrollable boxes.

18. A computer-readable medium having computer-executable instructions for performing steps comprising:

generating a displayable form within a graphical user interface, the displayable form including at least one controllable virtual user-input object;

establishing a set of key events, wherein at least a portion of the key events can be operatively associated with a plurality of different types of non-virtual user input mechanisms;

receiving user input via at least one non-virtual user input mechanism selected from the plurality of different types of non-virtual user input mechanisms;

establishing a behavior model for the displayable form; and determining when an operational change associated with the controllable virtual user-input object is required based at least on the behavior model and the received user input and when appropriate causing the operational change to occur such that the virtual user-input controllable object is graphically altered in appearance and associated controlled logic functionality is modified accordingly.

19. The computer-readable medium as recited in claim 18, wherein the controllable virtual user-input object is only operatively controllable when in an edit mode.

20. The computer-readable medium as recited in claim 19, wherein the controllable virtual user-input object is selectively placed in the edit mode via at least one of the key events.

21. The computer-readable medium as recited in claim 19, wherein the controllable virtual user-input object is selectively placed in the edit mode via an override identifier.

22. The computer-readable medium as recited in claim 19, wherein the controllable virtual user-input object is always in the edit mode.

23. The computer-readable medium as recited in claim 18, wherein the controllable virtual user-input object is only operatively controllable when the controllable virtual user-input object is in a focus mode.

24. The computer-readable medium as recited in claim 23, wherein the controllable virtual user-input object is selectively placed in the focus mode via at least one of the key events.

25. The computer-readable medium as recited in claim 23, wherein the controllable virtual user-input object is always in the focus mode.

26. The computer-readable medium as recited in claim 18, wherein the controllable virtual user-input object is programmable to selectively respond to each one of the key events.

27. The computer-readable medium as recited in claim 18, wherein the set of key events includes a subset of key events that operate independent an operational mode associated with the displayable form, and the operational mode includes an edit mode and a non-edit mode.

28. The computer-readable medium as recited in claim 18, wherein the set of key events includes a subset of key events that operate depending upon an operational mode associated with the displayable form, and the operational mode includes an edit mode and a non-edit mode.

29. The computer-readable medium as recited in claim 18, wherein a plurality of controllable virtual user-input objects are provided within the displayable form and a focus on a particular one of the controllable virtual user-input objects is selectable via at least one corresponding focus event selected from the set of key events.

30. The computer-readable medium as recited in claim 29, wherein, when placing the focus on the particular one of the controllable virtual user-input objects further allows the controllable virtual user-input object to be selectively placed in the edit mode via a corresponding edit event selected from the set of key events.

31. The computer-readable medium as recited in claim 30, wherein the controllable virtual user-input object is automatically placed in the edit mode when the focus is on the particular one of the controllable virtual user-input objects.

32. The computer-readable medium as recited in claim 18, wherein at least one of the set of key events is selected from a group of key events comprising: focus right, focus left, focus up, focus down, focus upper right, focus, lower left, focus, upper left, focus lower right, value right, value left, value up, value down, value increment, value decrement, enter edit, exit edit, focus next, focus previous, right, left, up, down, advance, decline, action, edit free right, edit free left, edit free up, edit free down, edit free advance, and edit free decline.

33. The computer-readable medium as recited in claim 18, wherein the controllable virtual user-input object is selected from a group of graphically displayable controllable virtual user-input objects comprising sliders, knobs, buttons, edit fields, spinners, and scrollable boxes.

34. An apparatus comprising:
   at least one non-virtual user input mechanism;
   a display; and
   logic operatively coupled to the non-virtual user input mechanism and the display and configured to generate a displayable form within a graphical user interface on the display wherein the displayable form includes at least one controllable virtual user-input object, establish a set of key events, wherein at least a portion of the key events can be operatively associated with the one none virtual user input mechanism and at least one other different type of non-virtual user input mechanism, receive user input via the one non-virtual user input mechanism, establish a behavior model for the displayable form, determine when an operational change associated with the controllable virtual user-input object is required based at least on the behavior model and the received user input, and cause the operational change to occur such that the virtual user-input controllable object is graphically altered in appearance and associated controlled functionality of the apparatus is modified accordingly.

35. The apparatus as recited in claim 34, wherein the controllable virtual user-input object is only operatively controllable when in an edit mode.

36. The apparatus as recited in claim 34, wherein the logic selectively places the controllable virtual user-input object in the edit mode based on at least one corresponding edit event selected from the set of key events.

37. The apparatus as recited in claim 34, wherein the logic selectively places the controllable virtual user-input object in the edit mode based on a definable override identifier.

38. The apparatus as recited in claim 34, wherein the controllable virtual user-input object is always in the edit mode.

39. The apparatus as recited in claim 34, wherein at least one of the set of key events is selected from a group of key events comprising: focus right, focus left, focus up, focus down, focus upper right, focus, lower left, focus, upper left, focus lower right, value right, value left, value up, value down, value increment, value decrement, enter edit, exit edit, focus next, focus previous, right, left, up, down, advance, decline, action, edit free right, edit free left, edit free up, edit free down, edit free advance, and edit free decline.

40. The apparatus as recited in claim 34, wherein the one non-virtual user input mechanism is selected from a group of non-virtual user input mechanisms comprising: an electrical switch, a mechanical switch, an optical switch, a thermal switch, a touch pad, a keypad, a button, a rotating knob, a push knob, a pull knob, a directional pad, a toggle switch, and a joystick.

41. The apparatus as recited in claim 34, wherein the controllable virtual user-input object is selected from a group of graphically displayable controllable objects comprising sliders, knobs, buttons, edit fields, spinners, and scrollable boxes.

* * * * *

UNITED STATES PATENT AND TRADEMARK OFFICE
CERTIFICATE OF CORRECTION

PATENT NO. : 6,704,032 B1
DATED : March 09, 2004
INVENTOR(S) : Falcon et al.

It is certified that error appears in the above-identified patent and that said Letters Patent is hereby corrected as shown below:

<u>Column 6,</u>
Line 1, delete "is" between "422" and "can".

Signed and Sealed this

Twenty-ninth Day of June, 2004

JON W. DUDAS
*Acting Director of the United States Patent and Trademark Office*